Feb. 25, 1964 W. VOLLRATH ETAL 3,122,362
CONVEYOR INSTALLATION
Filed Feb. 13, 1961 7 Sheets-Sheet 1

INVENTORS
WILLI VOLLRATH
GÜNTHER FUNK
BY
ATTORNEYS

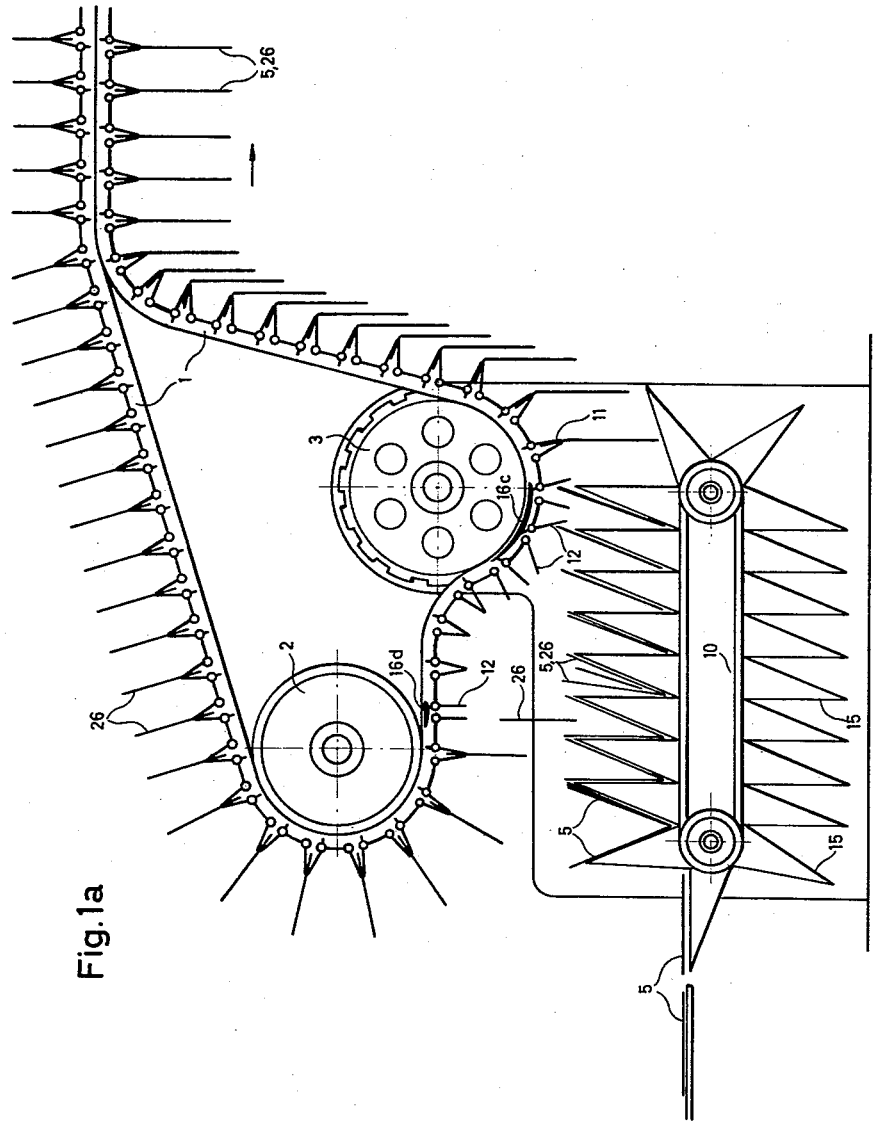

INVENTORS
WILLI VOLLRATH
GÜNTHER FUNK
BY
*Dicke, Craig & Freudenberg*
ATTORNEYS

Feb. 25, 1964     W. VOLLRATH ETAL     3,122,362
CONVEYOR INSTALLATION

Filed Feb. 13, 1961     7 Sheets-Sheet 5

INVENTORS
WILLI VOLLRATH
GÜNTHER FUNK
BY
ATTORNEYS

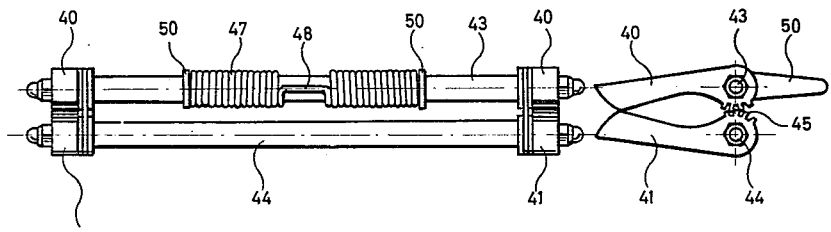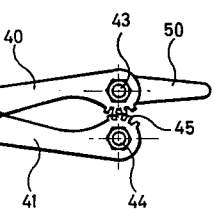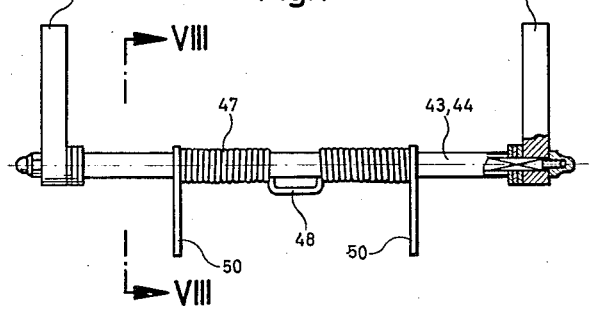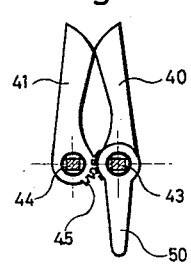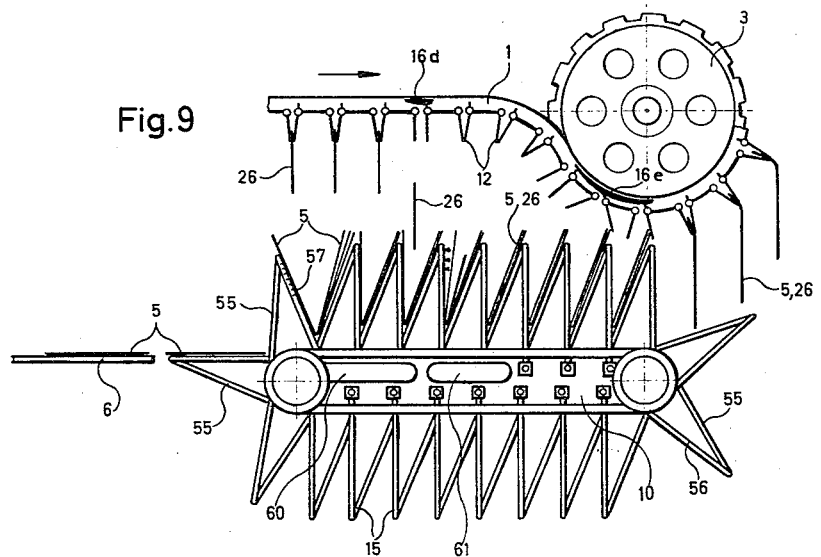

INVENTORS
WILLI VOLLRATH
GÜNTHER FUNK
BY Dicke + Craig
ATTORNEYS

United States Patent Office 3,122,362
Patented Feb. 25, 1964

3,122,362
CONVEYOR INSTALLATION
Willi Vollrath, Malsch, Baden, and Günther Funk, Karlsruhe, Baden, Germany, assignors to Firma Josef Funk KG, Karlsruhe, Baden, Germany
Filed Feb. 13, 1961, Ser. No. 88,733
Claims priority, application Germany Feb. 13, 1960
21 Claims. (Cl. 270—57)

The present invention relates to a method and corresponding installations necessary therefor for transporting or conveying and distributing into counted stacks printed matters produced by a rotary press such as newpapers, periodicals, brochures, advertising material, catalogs or the like. According to another feature of the present invention, supplements or enclosures such as, for example, advertising sheets, advertising bulletins, advertising booklets or the like are to be added to the printed matters, for example, by being inserted into a folded newspaper, simultaneously with the conveyance and distribution of the printed matters.

Installations for solving the different problems connected therewith are known per se in the prior art. For example, newspaper conveyor belts or conveyor bands are known in the prior art which receive from the rotary press the newspapers that are disposed overlappingly in a scale-like manner, between tension spring chords, and which convey the same in this manner to the end station of the conveyor band or belt. As a rule, the printed matters are usually taken off the conveyor belt at the terminal station by human work forces, are aligned flush, counted and stacked thereat. The work forces have to adapt themselves to the overlap width maintained at the outlet of the rotary press and have to arrange the removal, counting and stacking of the printed publications correspondingly. By reason of the human deficiencies, there occur oftentimes errors in the counting which lead to complaints.

It also happens oftentimes that the overlap width at the end of the belt is different, after a relatively long conveyor path or by reason of a complicated belt guidance, as a result of displacements of the samples of the printed matters mutually to each other, from that at the conveyor belt entrance, and additionally changes several times so that the work premises and hypotheses for the operating personnel become incomprehensible and complicated.

The fact that the printed matters overlap during transportation thereof entails the consequence that by reason of the mutual displacements of the still damp prints there occurs a smearing of the print. Furthermore, the tensioning spring chords resting against the printed portions of the printed publications cause smearing of the still damp print, and more particularly the more the greater the operating speed of the rotary press and therewith also of the conveyor installation.

For the last-described reasons transportation or conveyor systems have been proposed in the prior art which do not engage the printed zones of the printed matters. However, even with such conveyor installations the printed matters are disposed adjacent one another overlappingly in a scale-like manner so that the disadvantage of the mutual displacement of the printed matters is not eliminated thereby.

In recent times there exists more and more the tendency—thereby further increasing the underlying problem—to reproduce the printed products of the type under consideration, partly or entirely in color prints. Color prints, however, are known to dry more slowly than simple black prints. The transportation or conveyance of color prints with the installations known heretofore leads, therefore, by reason of the slower drying, to still greater inadequacies than with single-color prints. Furthermore, the limitation of the print velocity is not suited to solve this problem.

There also exist already, in the prior art, solutions for the second aim of the present invention, namely, the mechanical automatic addition of supplements or enclosures, which prior art solutions, however, are not satisfactory so that this activity has been carried out, for the most part, manually heretofore. This, however, presupposes that in case of necessity there are available work forces which can be called on short notice when the occasion for their need arises.

The aim underlies the present invention to provide a method that permits the performance of the operating steps of these two tasks simultaneously and in a far-reaching automatic manner, whereby, at the same time, the aforementioned inadequacies and shortcomings of the prior art methods are eliminated, and to create also the installations necessary to carry out this method.

For purposes of solving this problem there is proposed, in accordance with the present invention, a method which essentially consists in bringing the printed matters which arrive from the rotary press individually in an essentially horizontal position and disposed at a distance one behind the other, by means of an endless first intermediate conveyor system circulating in an approximately horizontal direction, individually into a position required for the transfer thereof in which they are subsequently picked up individually by the automatically operated grippers of a passing main conveyor system, and are thereupon transported or conveyed parallel to each other, at a short distance one behind the other, transversely to the direction of displacement and in a suspended manner to the distribution place where they are automatically counted and dropped off into counted stacks, whereas possibly at a different place of the installation the supplements are supplied simultaneously from a circulating second endless auxiliary conveyor system to the empty grippers of the main conveyor system which receive or pick-up the supplements and supply the same to the first auxiliary conveyor system where they are added automatically to the printed matters prepared thereat for the reception thereof, for example, to the unfolded printed publications, for example, by being dropped into the same.

Appropriately, the printed matters, for example, newspapers which arrive individually one behind the other, are brought in the first auxiliary conveyor system, by appropriate means, into an approximately vertical transfer position, and are simultaneously unfolded thereat for purposes of enabling the insertion of the supplements. The printed matters together with the supplements are thereupon transported on the moving lower portion of the main conveyor system advancing with a horizontal movement, to the counter and distribution place whereas the supplements that have to be still inserted are conveyed on the upper returning portion of the main conveyor system to the place of insertion at the first auxiliary conveyor system.

Consequently, the main conveyor system has to fulfill, with additional installations, the following three tasks, namely:

(1) To receive the completed printed matters together with the supplements as individual samples parallel to one another and to convey the same, one behind the other in a suspended manner, to the distribution place;

(2) To count the samples and drop off the same into counted stacks; and (3) To receive the supplements from the second auxiliary conveyor system and to transport the same to the first auxiliary conveyor system which unfolds the printed matters and brings the same to the transfer place.

The first auxiliary conveyor system has to fulfill two tasks, namely:

(1) To prepare the printed matters coming from the rotary press, in such a manner, for example, by unfolding the same that the supplements arriving on the main conveyor system may be added to the printed matters, for example, by being dropped into the same; and (2) To bring the printed matters, after the insertion of the supplements is realized, into the transfer position in which they can be picked-up, one after the other, by the grippers of the main conveyor system.

This combination of the operating performances to be carried out by the main conveyor system and by the first intermediate conveyor system in accordance with the present invention, results in an advantageous association of several important operating steps by means of which a saving, in particular, in operating steps, work forces and space is obtained and simultaneously therewith, above all, a protective handling of the printed products is assured.

A further significant advantage of the method and installation proposed therefor in accordance with the present invention which will be described more fully hereinafter, resides in the fact that by reason of the conveyance of the individual samples parallel to one another and at a distance one behind the other transversely to the direction of transportation, air spaces or air interstices are present which favor drying, especially if additionally dry warm air is blown against the printed products, for example, suspended in a vertical position. On the other hand, a significant amount of conveyor space is saved by the type of conveyor system in accordance with the present invention as compared to the prior art conveyor systems and the conveyor means may be operated with relatively slower advancing speeds.

The main conveyor system is appropriately constructed as a double sprocket chain or double steel side-bar chain forcibly or positively guided in both the vertical and horizontal directions whereby the individual members of the chain are provided along the upper side thereof with two projections, disposed one behind the other, in which are supported in a readily interchangeable manner the grippers for the printed matters.

The grippers may consist, for example, of two structural members in toothed engagement with each other and adapted to pivot towards each other in the manner of clothes pins which structural members are keyed to two shafts disposed one behind the other. A coil spring provided with a center bow member is placed over one of the two shafts which is clamped between two control levers keyed to this shaft. The two shafts of the grippers are rotatably supported within the projections or nose portions of the sprocket chain whereby the bow member of the spring is placed about one of the projections and is retained within a groove arranged on the side of the nose portion opposite the recess. As a result thereof, the spring is tensioned and the shaft is safeguarded against unintentional drop-out.

The first conveyor system which appropriately circulates with an approximately horizontal advance movement consists of an endless chain with abutment surfaces for the printed matters secured to the chain members, the distance of the abutment surfaces being preferably identical with the distance of the grippers on the main conveyor system. The abutment surfaces may be formed, for example, by struts guided in both the horizontal and vertical directions.

For purposes of unfolding and refolding the printed matters within the first auxiliary conveyor system, to enable insertion of the supplements, there may be provided at the struts of the abutment surfaces tubular members or pipes for conducting therethrough either suction air or compressed air, which tubular members or pipes are provided with nozzle-like apertures terminating, i.e., having the orifices thereof within the plane of abutment. Furthermore, a suction chamber is arranged within the first auxiliary conveyor system followed by a pressure chamber which are placed into communication with the pipes or tubular members of the first auxiliary conveyor system passing over the same in such a manner that, when the pipes pass over the vacuum chamber, a suction draft is produced within the pipes by means of which one of several leaves or sheets of the printed matter are sucked in so that the printed matter is effectively unfolded thereby and the supplement can be dropped into the same. After this is realized, the pipes of the first auxiliary conveyor system reach the area disposed over the adjoining pressure chamber and the pressure air stream refolds the unfolded printed matters, whereupon they are picked up or seized, together with the supplements, at the transfer place by the grippers of the main conveyor system.

The drop or release of the printed matters at the distribution place takes place by means of control rails, cams or the like, which open the grippers, guided past the same, one after another so that the printed matters drop out and arrange themselves into stacks, as will become more clear from the following detailed description.

For purposes of counting and controlling the release of the prints, a separate counter installation is provided, for example, a light barrier or an analogous installation arranged at the drop-off or release place, for instance, an electric mechanical micro-switch installation with a counting device, by means of which the first control rail, i.e., the one encountered first in the direction of movement of the advancing lower conveyor portion of the main conveyor system is rendered inoperative after a predetermined number is reached in a stack, for example, by being moved out of the effective position thereof so that the next control rail, i.e., the one disposed behind the first control rail, becomes effective to control the drop or release of the printed matters.

Consequently, the control rail or control rails, which are arranged one behind the other in the direction of movement of the lower advancing belt portion of the main conveyor system and service several stacking places, are adapted to be rendered ineffectual, for example, are arranged to be adjustable in the vertical direction thereof whereas only the last control rail is arranged in a fixed manner.

After dropping or releasing the preselected number of samples to be stacked, the corresponding control rail is effectively disengaged whereupon the next following control rail becomes effective. After the last control rail which cannot be disengaged has reached its preselected number of samples, all of the preceding control rails arranged ahead of the last control rail are re-engaged by the counter device whereupon the sequence of operation begins anew.

Accordingly, it is an object of the present invention to provide a conveyor system of the type described hereinabove which eliminates the inadequacies and shortcomings of the prior art devices.

It is another object of the present invention to provide a conveyor system for transporting printed matters from the printing press to the place where they are to be distributed which is simple in construction, reliable in operation and also entails considerable space savings.

Still another object of the present invention resides in the provision of a conveyor system which permits, in a reliable manner, the addition of supplements, enclosures or annexes to the printed matters, such as newspapers, periodicals, advertising brochures, catalogs or the like without endangering the proper operation of the conveyor system.

A still further object of the present invention resides in the provision of a conveyor system which automatically counts and stacks the predetermined number of prints in a desired number of places.

A further object of the present invention resides in the provision of a conveyor system of the type described hereinabove which completely eliminates the shortcomings normally encountered with systems requiring manual handling that cause faulty operation due to the deficiencies and shortcomings of the human element.

Another object of the present invention resides in the provision of a conveyor system for conveying printed matters from a rotary press to the place of distribution thereof which assures safe handling of the printed matters together with a minimum danger of smearing of the still wet print, especially in connection with color prints.

Still a further object of the present invention resides in the provision of a conveyor system for conveying printed matters from the rotary presses to the point of distribution which permits improved operating speeds in the conveyor system.

A further object of the present invention resides in the provision of a conveyor system utilizing such a main conveyor arrangement that the printed matters are conveyed in a suspended manner spaced from one another at predetermined distances to thereby favor drying of the print and enable effectively a speed-up in the drying by the possible supply of heated drying air.

Another object of the present invention resides in the provision of a conveyor system offering great versatility in the operation and utilization thereof.

These and other objects, features and advantages of the present invention will become more obvious from the following description when taken in connection with the accompanying drawing which shows, for purposes of illustration only, one embodiment in accordance with the present invention, and wherein FIGURE 1 is a somewhat schematic side elevational view of the overall installation in accordance with the present invention;

FIGURE 2b is a plan view of FIGURE 2a;

FIGURE 5 is a top plan view of the gripping arrangement in accordance with the present invention;

FIGURE 6 is a side elevational view of the gripping arrangement of FIGURE 5;

FIGURE 7 is a front elevational view of the gripping arrangement of FIGURE 5;

FIGURE 8 is a cross sectional view taken along line VIII—VIII of FIGURE 7;

FIGURE 9 is a partial side elevational view illustrating the first conveyor system and a portion of the main conveyor system in accordance with the present invention, the first conveyor system being provided with means for unfolding and refolding the printed matters;

Figure 1:
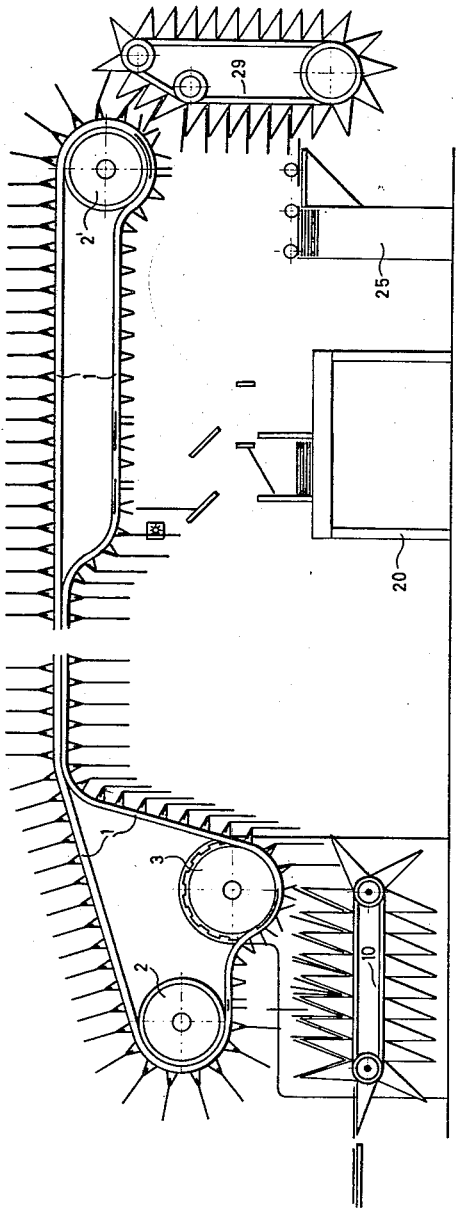
FIGURES 1a and 1b are side elevational views, on an enlarged scale, similar to FIGURE 1, of the overall installation.

Referring now to the drawing wherein like reference numerals are used throughout the various views to designate like parts, and more particularly to FIGURE 1, the conveyor of the main conveyor system is designated therein by reference numeral 1 and is constituted by an endless circulating chain arranged in such a manner as to comply with local conditions. The chain is guided over reversing-rollers 2 and 2' and is driven in any suitable manner from an appropriate chain wheel such as a sprocket wheel 3.

The individual samples of printed matter 5, such as newspapers, periodicals or the like, arrive, folded together, from a rotary printing press (not shown) on a conveyor band 6, and are thereupon automatically taken over by the first auxiliary conveyor system 10 and transported to the transfer place 11 where they are picked up or seized automatically by the grippers 12 secured to the main conveyor 1 in essentially parallel relationship to each other and one behind the other at a slight distance and are transported suspended transversely to the direction of movement of the main conveyor system 1 to the stacking place 20.

The first auxiliary conveyor system 10 consists of a plurality of compartments provided with abutment surfaces 15 and secured to an endless chain which receive the printed products 5 arriving from the rotary press. Further details of the first conveyor system 10 will be described more fully hereinafter.

The grippers 12 are automatically opened by a control rail 16a, cam or the like, above the place of distribution or place of release, the location of which may be suitably chosen within the area of the lower advancing conveyor portion 1 of the main conveyor system. The printed matters 5 thus released upon opening of grippers 12, slide over slideways, chutes or along guides 18 to the first stacking place 20a where they are stacked in the suitably preselected number. As shown in FIGURE 1, several stacking places 20a, 20b with slideways, etc., may be arranged adjacent one another at the release station for the printed matters. At a further station 25, disposed along the path of the lower portion of the main conveyor 1, there are stacked, as supplements 26, advertising sheets, booklets or other printed products which are supplied by a conveyor means 28 to a second auxiliary conveyor system 29 of similar construction as the first auxiliary conveyor system 10 and arranged within the area of the second reversing roller 2' of the main conveyor system 1. A guide rail 16c is provided rearwardly of the second reversing roller 2' of the main conveyor system 1 which guide rail 16c so controls the grippers 12 that they are capable of automatically receiving or picking up the supplements 26 and conveying the same over the returning upper portion of the main conveyor 1 to a point near the forward reversing roller 2. A further control rail 16d automatically opens the grippers 12 within the area of the forward reversing roller 2 and the supplements 26 thereby fall or are dropped into the printed matters 5 arriving, in an unfolded manner, on the first auxiliary conveyor system 10. Further details of this operation will be described more fully hereinafter.

Figure 3:
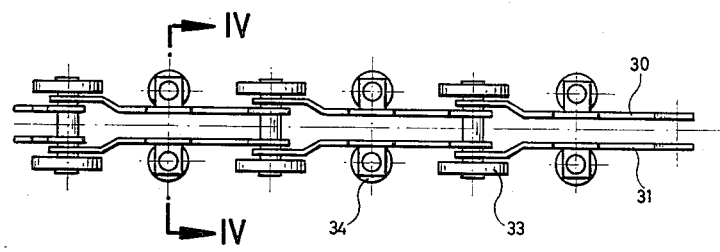
FIGURE 3 is a top plan view of the conveyor chain of FIGURE 2.
Figure 2:
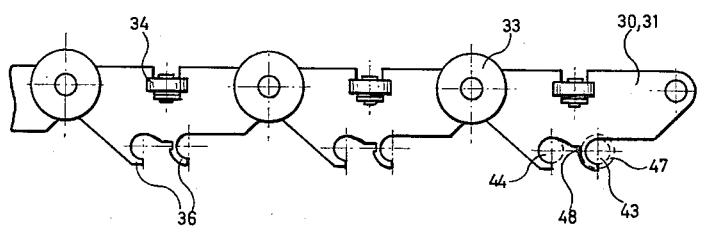
FIGURE 2 is a side elevational view of a portion of the conveyor chain of the main conveyor system.
Figure 4:
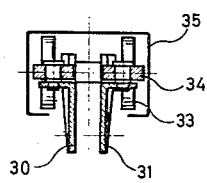
FIGURE 4 is a cross-sectional view taken along line IV—IV of FIGURE 3.
Figure 2B:
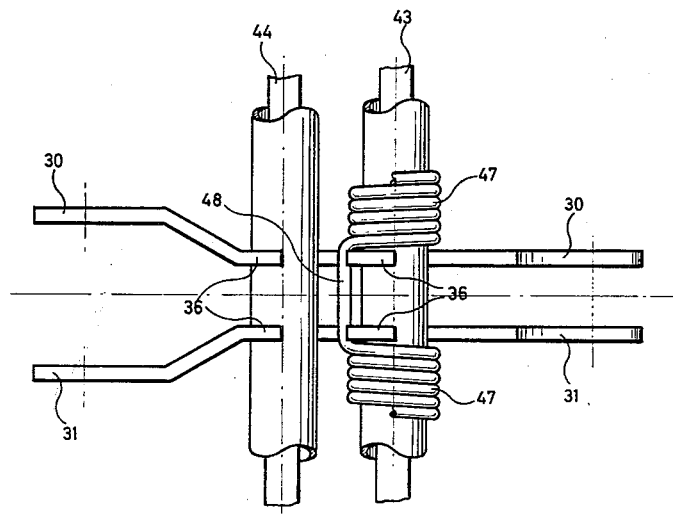
Figure 2A:
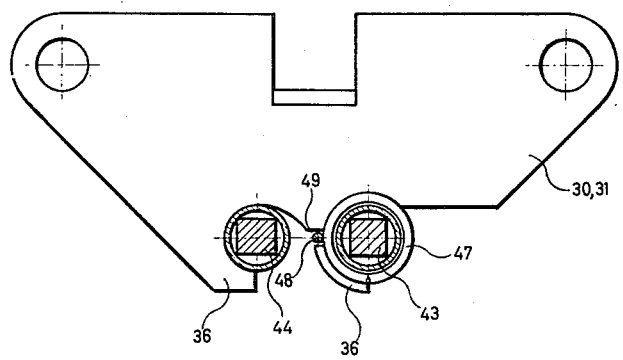
FIGURE 2a is a side elevational view, on an enlarged scale, of a chain member of the main conveyor system with the gripping means inserted therein.

The main conveyor 1 consists, in the construction shown as an illustrative example, of a chain including double side bars 30 and 31 (FIGURES 2 to 4) which travel within a guide path 35 by means of vertical roller members 33 arranged at the joints of the chain. Additionally, the chain members 30 and 31 are provided with lateral roller members 34 and, at the bottom thereof, with two pairs of nose portions or projections 36 disposed behind each other, the significance of which will be described more fully hereinafter.

The gripper arrangements (FIGURES 5 to 8) arranged at each chain member consist of two parts 40 and 41 adapted to be mutually pivoted with respect to each other in the manner of clothes pins. The parts 40 and 41 are wedged or keyed to two shafts 33 and 34 disposed one behind the other and are in meshing engagement with each other by a toothed connection 45. A coil spring 47 is emplaced upon the one shaft 43, which coil spring 47 is provided in the center portion thereof with a bow member 48. The spring 47 is arranged between two control levers 50 wedged or keyed to the shaft 43 which levers 50 cooperate with the guide rails 16. For purposes of tensioning the spring 47 and of latching or securing the shafts, the bow member 48 is engaged across a pair of projections 36, in grooves arranged on the backsides thereof.

The first auxiliary conveyor 10 consists in the illustrated embodiment of struts 55 guided at the conveyor frame in the horizontal and vertical planes. The pipes or tubular members 56 are secured at the struts 55 or possibly are also arranged thereat so as to be movable and additionally are provided with nozzle-like bores 57 the orifices of which terminate within the abutment surface. A vacuum chamber 60 is further arranged within the first auxiliary conveyor 10 over which pass sections of the pipes 56 whereby the pipes come into communication with the vacuum chamber 60 through apertures arranged at the vacuum chamber and at the pipe sections. As soon as the pipes 56 pass over the vacuum chamber 60, one of several sheets of the printed matters 5 inserted into the compartments of the first auxiliary conveyor system 10 are sucked in by means of bores 57 and retained thereat whereas the remainder of the sheets of each printed matter 5 fall against the struts 55 so that the printed matters 5 are effectively folded apart thereby and are readied for the reception of the supplements 26.

Shortly after the drop-off station or release place of the supplements 26, near the control rail 16d, there exists within the auxiliary conveyor system 10 an excess pressure chamber 61 from which the pipes 56 are supplied with compressed air in any suitable manner. Under the effect of the compressed air, discharged through bores 57, the unfolded printed matters 5 are again folded so that the same, together with the supplement or supplements 26, are adapted to be seized by the grippers 12 of the main conveyor system 1 which are opened under the effect of a further control rail 16e and are closed again subsequent thereto.

Figure 11:
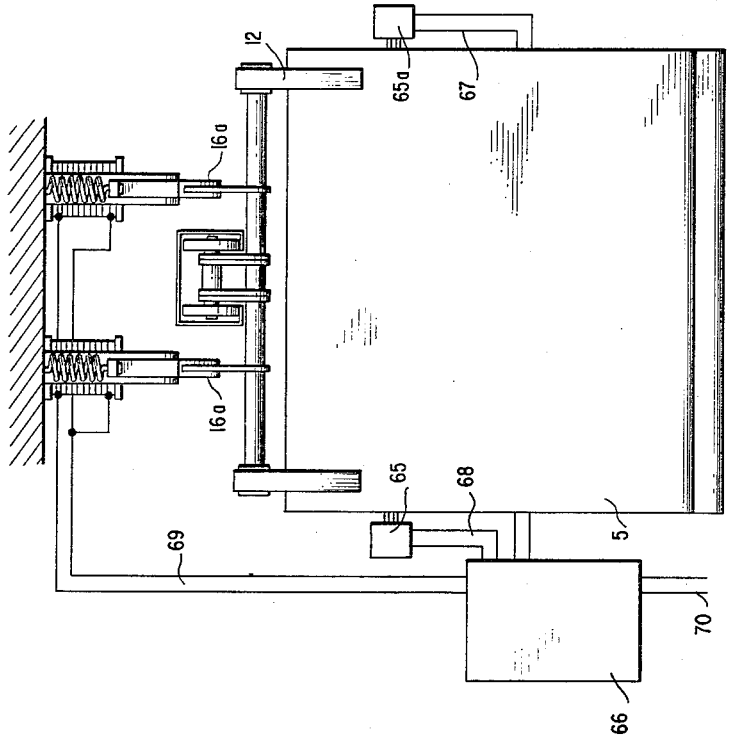
FIGURE 11 is a frontal view of a counting station.
Figure 10:
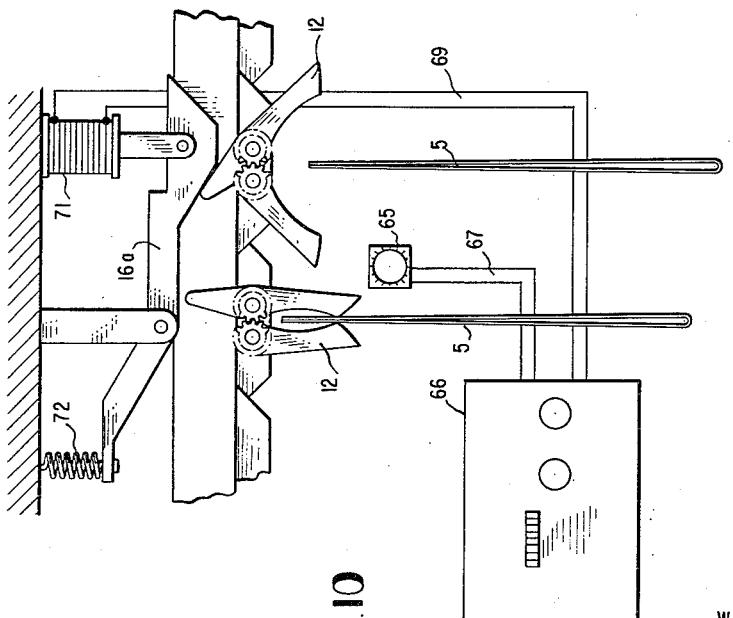
FIGURE 10 is a side elevational view of the counting station for the conveyor system of FIGURE 1.

For purposes of counting and dropping off the printed matters 5, together with the supplements 26, at one or several stacking places 20a, 20b of the distribution station, the printed matters 5 pass a counting station of any conventional construction which may be, for example, in the form of a light barrier, i.e., a light beam cooperating with photoelectric means as schematically illustrated in FIGURES 10 and 11, or a mechanical-electric microswitch installation. The counter station is provided with any well known means which makes it possible to produce a control pulse after reaching a pre-selected number of pieces. After reaching this predetermined number, the control rail 16a which is arranged at the distribution place first in the direction of movement of the advancing lower portion of the main conveyor 1, is displaced by the effect of the control pulse from the operative position thereof, for example, is displaced upwardly in any suitable manner by conventional control means. This has as result that, for example, with a pre-selected number of fifty samples for the stacking place 20a, after the release thereof, the control rail 16a is raised whereupon the next following control rail 16b becomes operative which, in the illustrated embodiment, is a stationary control rail. The printed matters 5 are now transported by the main conveyor 1 to the control rail 16b under the influence of which the next fifty samples, or possibly also any other pre-selected number, are dropped off at the second stacking place 20b. After attaining this number of stacked samples, the preceding control rail 16a is again automatically re-engaged, for example, is again lowered by a further control pulse produced in the counter station so that the first stacking place 20a is again supplied with the preselected number of samples. Of course, analogous to this arrangement, also more than two stacking places, one behind the other and in any suitable spatial arrangement, for example, also at a greater distance from each other, may be provided in the system according to the present invention. It is, of course, within the purview of the present invention to provide a manually actuatable disengagement, if so desired, for instance, for emergency operations, for the control rail 16a and any other control rail in addition to the automatic control device described hereinabove.

Figure 1B:
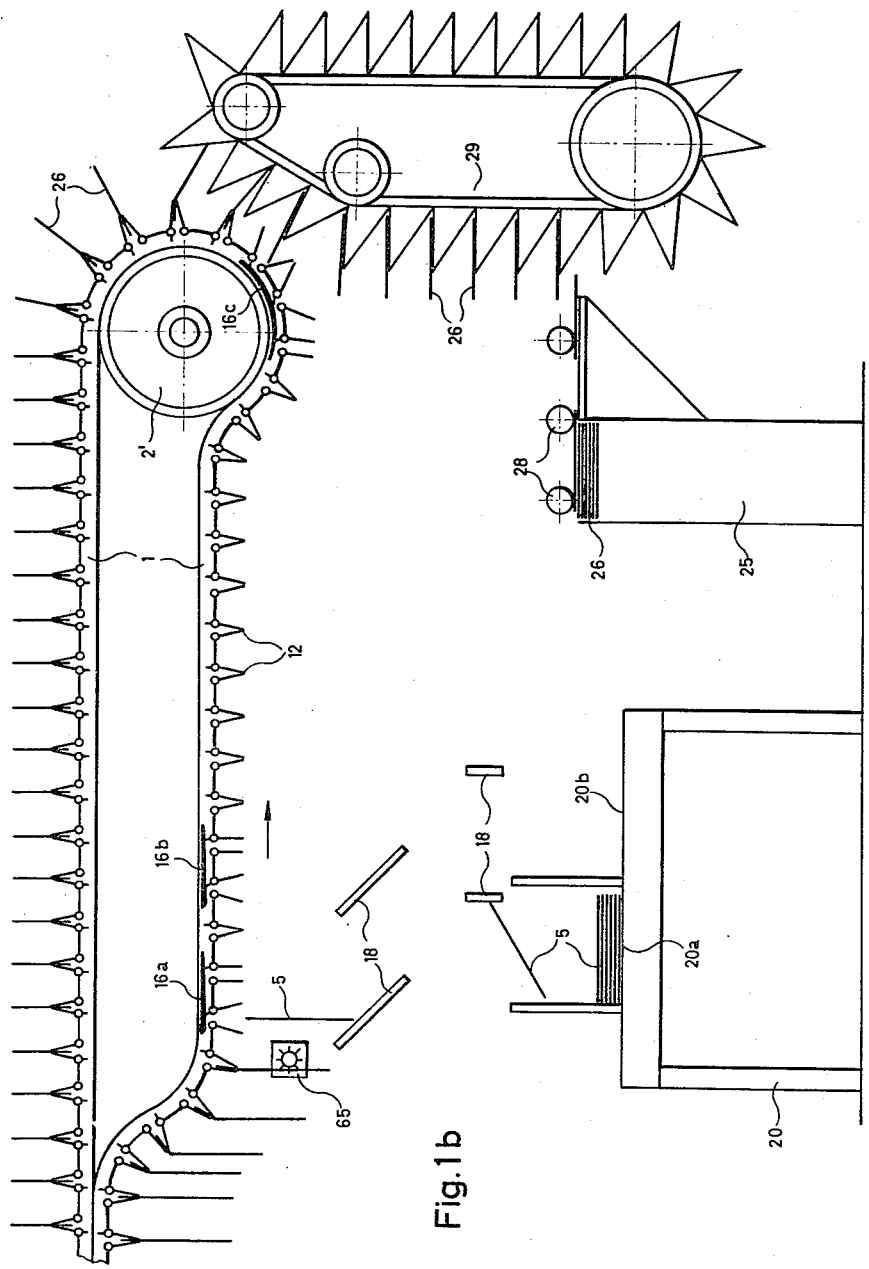

Considering the specific counting device schematically illustrated in FIGURES 10 and 11, the printed papers 5 arrive at the counting station suspended in the gripping devices 12 on the lower strand of the conveyor 1. The pair of steering rails 16a which open the gripping devices 12 in the releasing position are provided above the counting station. In the case illustrated, two depots are formed, the second pair of steering rails 16b (see FIGURE 1b) being provided stationary so that the printed papers which are not released by the pair of steering rails 16a are released by the pair of steering rails 16b.

As the papers being dropped pass in front of the light emitter 65, they produce an impulse by darkening the light barrier formed between the light emitter 65 and the light receiver 65a, which impulse is transmitted to a conventional counting and steering device 66, the current generated by the impulse is intensified and registered in a counting device, or counting installation. This counting installation or system may consist of a mechanical counting or metering means or of counting or metering tubes. Both forms of counting systems are known and commercially available. Besides the counting or metering means, the counting and steering device 66 also contains preselection means with which a predetermined number of papers is recorded. Once the predetermined number of pieces has been reached, a working circuit 69 closes in the counting and steering device 66 and excites the pair of solenoids 71 whereby the pair of steering rails 16a is raised. The printed papers 5 will thereafter pass by the first stack and be released on the stationary pair of steering rails 16b above the second depot or stack. A reversal to the first depot or stack takes place when the next predetermined number of pieces or sheets has been reached by interruption of the working circuit 69 by the action of the counting and steering device 66. As a result thereof, the solenoids 71 are de-energized and the steering rails 16a are lowered into the paper releasing condition by the spring 72. The counting device is supplied energy via circuit 70 from a source. The function of the entire counting station consists in that the printed papers 5 which arrive in rapid succession are deposited into separate stacks of a predetermined number. In the intervals which will occur during formation of the separate stacks, the counted stacks may be removed either manually or by other means and prepared for shipping.

Since the operation for the disengagement and re-engagement of the control rails 16a, 16b, etc., may be of any conventional known construction forming no part of the present invention and including, for example, any suitable counting means such as the photoelectric counter together with the pulse counting device adapted to produce a control pulse after reaching a predetermined number of counted pulses, as well as any known mechanical, electrical, pneumatic or hydraulic actuating means for actuating these control rails, a more detailed description of such a control system is believed unnecessary.

It can be readily seen that the present invention permits utmost freedom in the arrangement and mutual relationship of the different parts of the installation, such as of the two auxiliary conveyor systems and the stacking places at the distribution station, so that the actual physical layout of the overall installation may be adapted, in a far reaching manner, to the given conditions as regards organizational requirements thereof.

While we have shown and described one embodiment in accordance with the present invention, it is understood that the same is not limited thereto but is susceptible of many changes and modifications within the spirit and scope of the present invention, and we, therefore, do not wish to be limited to the details shown and described herein but intend to cover all such changes and modifications as are encompassed by the scope of the appended claims.

We claim:

1. An apparatus for the simultaneous transportation and distribution of printed matters into counted stacks and for the addition thereto of supplements, comprising first auxiliary endless conveyor means circulating in an approximately horizontal direction for bringing the printed matters, arriving from the printing device separate and one behind the other to a transfer place in the position required for transfer, main conveyor means including gripper means for automatically and individually picking up the printed matters at said transfer place to convey the same in a suspended manner parallel to each other and at a short distance one behind the other essentially transversely to the direction of movement to a distribution station, means for releasing said printed matter from said gripper means and for counting said printed matters arranged at said distribution station, and second auxiliary conveyor means for supplying supplements from another place to the gripper means of said main conveyor means at a transfer position following said distribution station, means within the region of said transfer position for actuating said gripper means to pick up said supplements and convey the supplements by said main conveyor means to said first auxiliary conveyor means, said first auxiliary conveyor means including means for preparing said printed matters to receive the supplements released thereat by said gripper means, and means within the region of said preparing means for releasing said supplements to be added to the printed matters prepared thereat for the reception thereof.

2. An apparatus for the simultaneous transportation and distribution of printed matters into counted stacks and for the addition thereto of supplements, comprising first auxiliary endless conveyor means circulating in an approximately horizontal direction for bringing the printed matters, arriving from the printing device separate and one behind the other to a transfer place in the position required for transfer, endless main conveyor means having a lower forwardly moving conveyor portion and an upper returning conveyor portion and including gripper means for automatically and individually picking up the printed matters at said transfer place to convey the same on said lower portion in a suspended manner parallel to each other and at a short distance one behind the other essentially transversely to the direction of movement to a distribution station, means for actuating said gripper means to release said printed matters held thereby and for counting said printed matters at said distribution station, and second auxiliary conveyor means for supplying supplements from another place to the empty gripper means of said main conveyor means at a transfer position following said distribution station in the direction of travel of said endless main conveyor means, means for actuating said gripper means to pick up and convey the supplements by the upper portion of said main conveyor means to said first auxiliary conveyor means, said first auxiliary conveyor means including means for preparing said printed matters to receive the supplements released thereat by said gripper means, and means within the region of said preparing means for releasing said supplements to be added to the printed matters prepared thereat for the reception thereof.

3. An apparatus for the simultaneous transportation and distribution of printed matters into counted stacks and for the addition thereto of supplements, comprising first auxiliary endless conveyor means circulating in an approximately horizontal direction for bringing the printed matters, arriving from the printing device separate and one behind the other, to a transfer place in the position required for transfer, main conveyor means including gripper means for automatically and individually picking up the printed matters at said transfer place to convey the same in a suspended manner parallel to each other and at a short distance one behind the other essentially transversely to the direction of movement to a distribution station, means at the distribution position for selectively opening said gripper means to release the printed matter held thereby at a respective one of a plurality of stacking places including counting means for counting the number released at each stacking place and control means operatively connected with said counting means for effectively limiting the number of printed matters to be released at a respective stacking place and for releasing thereupon the preselected number of printed matters at the next stacking place in the direction of the advance movement of said main conveyor means until the last stacking place is supplied with its preselected number of printed matters whereupon the cycle is recommenced by supplying the first stacking place with pirnted matters, and second auxiliary conveyor means for supplying supplements from another place to the empty gripper means of said main conveyor means at a transfer position following said distribution station in the direction of travel of said main conveyor means, means for actuating said gripper means to pick up the supplements at said transfer position and convey the supplements by said main conveyor means to said first auxiliary conveyor means, said first auxiliary conveyor means including means for preparing said printed matters to receive the supplements released thereat by said gripper means, and means within the region of said preparing means for releasing said supplements to be added to the printed matters prepared thereat for the reception thereof.

4. An apparatus for the simultaneous transportation and distribution of printed matters into counted stacks, comprising first auxiliary endless conveyor means circulating in an approximately horizontal direction for bringing the printed matters, arriving from the printing device separate and one behind the other, to a transfer place in the position required for transfer, main conveyor means including gripper means for automatically and individually picking up the printed matters at said transfer place to convey the same in a suspended manner parallel to each other and at a short distance one behind the other essentially transversely to the direction of movement to a distribution station, movable means at the distribution place for selectively engaging said gripper means and actuating said gripper means to release said printed matters held thereby at a respective one of a plurality of stacking places, including counting means for counting the number released at each stacking place and control means operatively connected with said counting means and said movable means including means for removing said movable means from the path of said gripper means when a predetermined number of printed matters have been released at the respective stacking place to thereby effectively limit the number of printed matters to be released at a respective stacking place, said control means upon removal of the movable means releasing the preselected number of printed matters at the next stacking place in the direction of the advance movement of said main conveyor means until the last stacking place is supplied with its preselected number of printed matters whereupon the cycle is recommended by supplying the first stacking place with printed matters.

5. An apparatus for the simultaneous transportation and distribution of printed matters into counted stacks and for the addiiton thereto of supplements, comprising first auxiliary endless conveyor means circulating in an approximetaly horizontal direction for bringing the printed matters, arriving from the printing device separate and one behind the other, to a transfer place in the position required for transfer, main conveyor means including gripper means for automatically and individually picking up the printed matters at said transfer place to convey the same in a suspended manner parallel to each other and at a short distance one behind the other essentially transversely to the direction of movement to a distribution station, said main conveyor means and said first auxiliary conveyor means extending approximately parallel to each other over a portion thereof and including means for operating said first auxiliary conveyor means and said first auxiliary conveyor means synchronously at the same forward speed, means for actuating said gripper means at said distribution station to release said printed matters held thereby including means for counting said printed matters, and second auxiliary conveyor means for supplying supplements from another place to the empty gripper means of said main conveyor means at a transfer position following distribution station in the direction of travel of said main conveyor means, means at said transfer position for actuating said gripper means to pick up and convey the supplements by said means conveyor means to said first auxiliary conveyor means, said first auxiliary conveyor means including means for preparing said printed matters to receive the supplements released thereat by said gripper means, and means within the region of said preparing means for releasing said supplements to be added to the printed matters prepared thereat for the reception thereof.

6. An apparatus for the simultaneous transportation and distribution of printed matters into counted stacks and for the addition thereto of supplements, comprising first auxiliary endless conveyor means circulating in an approximately horizontal direction for bringing the printed matters, arriving from the printing device separate and one behind the other, to a transfer place in the position required for transfer, endless main conveyor means including reversing means at two places for reversing the direction of movement of said main conveyor means to provide an advancing conveyor portion and a returning conveyor portion and further including gripper means for automatically and individually picking up the printed matters including said supplements at said transfer place to convey the same in a suspended manner parallel to each other and at a short distance one behind the other essentially transversely to the direction of movement to the distribution station, means for opening said gripper means to release said printed matters held thereby at said distribution station including means for counting said printed matters, and second auxiliary conveyor means for supplying supplements from another place to the empty gripper means of said main conveyor means at a transfer position following said distribution station in the direction of travel of said endless main conveyor means, means for actuating said gripper means to pick up said supplements at said transfer position and convey the supplements by said main conveyor means to said first auxiliary conveyor means, said first auxiliary conveyor means including means for preparing said printed matters to receive the supplements released thereat by said gripper means, and means within the region of said preparing means for releasing said supplements to be added to the printed matters prepared thereat for the reception thereof, the pick-up, conveyance and release of the complete printed matters including the supplements taking place in the advancing direction of said main conveyor means while the pick-up, conveyance and release of said supplements takes place over said reversing means and the return direction of said main conveyor means.

7. An apparatus for the simultaneous transportation and distribution of objects into counted stacks and for the addition thereto of supplements, comprising first auxiliary endless conveyor means for bringing said objects arriving individually, to a transfer place in the position required for transfer, mean conveyor means including pick-up means for automatically and individually picking up said objects at said transfer place to convey the same in a suspended manner, at a short distance one behind the other to the distribution station, means for actuating said pick-up means to release said objects at said distribution station including means for counting said objects, and second auxiliary conveyor means for supplying supplements from another place to the pick-up means of said main conveyor means at a transfer position following said distribution station in the direction of travel of said main conveyor means, means for actuating said pick-up means to individually pick up said supplements and convey the supplements by said main conveyor means to said first auxiliary conveyor means, said first auxiliary conveyor means including means for enabling the addition of the supplements released thereat to said objects, and means within the region of said last-mentioned means for releasing said supplements to be added thereat to said objects prepared thereat for the reception thereof.

8. An apparatus for the simultaneous transportation and distribution of printed matters into counted stacks and for the addition thereto of supplements, comprising first auxiliary conveyor means advancing in an approximately horizontal direction for bringing the printed matters, arriving from the printing device separate and one behind the other, to a transfer place in the position required for transfer, said first auxiliary conveyor means including endless chain means provided with abutment surface means for the printed matter, main conveyor means including second endless chain means positively guided in orthogonal planes and gripper means on said chain means for automatically and individually picking up the printed matters at said transfer place to convey the same in a suspended manner, parallel to each other and at a short distance one behind the other, essentially transversely to a direction of movement to the distribution station, said second chain means being of double-side-bar construction and consisting of a plurality of chain elements, two pairs of projections disposed one behind the other being provided along the top side of individual chain elements, said gripper means being supported in said projections, means for actuating said gripper means at said distribution station to release said printed matters held thereby including means for counting said printed matters, second auxiliary conveyor means having an essentially vertical advance movement and including third endless chain means provided with abutment surface means for the supplements for supplying the supplements from another place to the empty gripper means of said main conveyor means at a transfer position following said distribution station in the direction of travel of said main conveyor means, means for actuating said gripper means to pick up and convey the supplements by said main conveyor means to said first auxiliary conveyor means, said first auxiliary conveyor means including means for preparing said printed matters to receive the supplements released thereat by said gripper means, and means within the region of said preparing means for leasing said supplements to be added to the printed matters prepared thereat for the reception thereof, and means for synchronously operating said main conveyor means as well as said first and second auxiliary conveyor means.

9. An apparatus for the simultaneous transportation and distribution of printed matters into counted stacks and for the addition thereto of supplements, comprising first auxiliary conveyor means advancing in an approximately horizontal direction for bringing the printed matters, arriving from the printing device separate and one behind the other, to a transfer place in the position required for transfer, said first auxiliary conveyor means including endless chain means provided with abutment surface means for the printed matter, main conveyor means including second endless chain means positively guided in orthogonal planes and gripper means on said chain means for automatically and individually picking up the printed matters at said transfer place to convey the same in a suspended manner, parallel to each other and at a short distance one behind the other, essentially transversely to the direction of movement to a distribution station, second chain means being of double-side-bar construction and consisting of a plurality of chain elements, two pairs of projections disposed one behind the other being provided along the top side of individual chain elements, said gripper means being of clothespin-like construction each having two mutually pivotable members and means including pin means supporting said pivotable members in said chain means, means for actuating said gripper means at said distribution station to release said printed matters held thereby including means for counting said printed matters at said distribution station, and second auxiliary conveyor means having an essentially vertical advance movement and including third endless chain means provided with abutment surface means for the supplements for supplying the supplements from another place to the empty gripper means of said main conveyor means at a transfer position following said distribution station in the direction of travel of said main conveyor means, means for actuating said gripper means to pick up said supplements at said transfer position and convey the supplements by said main conveyor means to said first auxiliary conveyor means, said first auxiliary conveyor means including means for preparing said printed matters to receive the supplements released thereat by said gripper means, and means within the region of said preparing means for releasing said supplements to be added to the printed matters prepared thereat for the reception thereof, and means for synchronously operating said main conveyor means as well as said first and second auxiliary conveyor means.

10. An apparatus for the simultaneous transportation and distribtuion of printed matters into counted stacks and for the addition thereto of supplements, comprising first auxiliary conveyor means advancing in an approximately horizontal direction for bringing the printed matters, arriving from the printing device separate and one behind the other, to a transfer place in the position required for transfer, said first auxiliary conveyor means including endless chain means provided with abutment surface means for the printed matter formed by strut means and means for guiding said strut means in the horizontal and vertical direction, pipe means arranged at said strut means for the conduction therethrough of suction air and pressurized air, said pipe means being provided with discharge apertures terminating essentially within the plane of abutment of said abutment surface means, main conveyor means including second endless chain means positively guided in orthogonal planes and gripper means on said chain means for automatically and individually picking up the printed matters at said transfer place to convey the same in a suspended manner, parallel to each other and at a short distance one behind the other, essentially transversely to the direction of movement to a distribution station, said second chain means being of double-side-bar construction and consisting of a plurality of chain elements, two pairs of projections disposed one behind the other being provided along the top side of individual chain elements, said gripper means being supported in said projections, means at said distribution station for actuating said gripper means to release said printed matters held thereby including means for counting said printed matters, and second auxiliary conveyor means having essentially vertical advance movement and including third endless chain means provided with abutment surface means for the supplements for supplying the supplements from another place to the empty gripper means of said main conveyor means at a transfer position following said distribution station in the direction of travel of said main conveyor means, means at said transfer position for actuating said gripper means to pick up said supplements thereat and convey the supplements by said main conveyor means to said conveyor means, said first auxiliary pipe means forming a means for preparing said printed matters to receive the supplements released thereat by said gripper means, and means within the region of said preparing means for releasing said supplements to be added to the printed matters prepared thereat for the reception thereof, and means for synchronously operating said main conveyor means as well as said first and second auxiliary conveyor means.

11. An apparatus for the simultaneous transportation and distribution of printed matters into counted stacks and for the addition thereto of supplements, comprising first auxiliary conveyor means advancing in an approximately horizontal direction for bringing the printed matters, arriving from the printing device separate and one behind the other, to a transfer place in the position required for transfer, said first auxiliary conveyor means including endless chain means provided with abutment surface means for the printed matter formed by strut means, pipe means arranged at said strut means for the conduction therethrough of suction air and pressurized air, said pipe means being provided with discharge apertures terminating essentially within the plane of abutment of said abutment surface means; vacuum and pressure chamber means in said first auxiliary conveyor means, said pipe means coming into communication sequentially with said chamber means, main conveyor means including second endless chain means positively guided in orthogonal planes and gripper means on said chain means for automatically and individually picking up the printed matters at said transfer place to convey the same in a suspended manner, parallel to each other and at a short distance one behind the other, essentially transversely to a direction of movement to the distribution station, said second chain means being of double-side-bar construction and consisting of a plurality of chain elements, two pairs of projections disposed one behind the other being provided along the top side of individual chain elements, said gripper means being supported in said projections, means at said distribution station for actuating said gripper means to release said printed matters held thereby including means for counting said printed matters, and second auxiliary conveyor means having essentially vertical advance movement and including third endless chain means provided with abutment surface means for the supplements for supplying the supplements from another place to the empty gripper means of said main conveyor means at a transfer position following said distribution station in the direction of travel of said main conveyor means, means at said transfer position for actuating said gripper means to pick up said supplements thereat and convey the supplements by said main conveyor means to said first auxiliary conveyor means, said pipe means forming a means for preparing said printed matters to receive the supplements released thereat by said gripper means, and means within the region of said preparing means for releasing said supplements to be added to the printed matters prepared thereat for the reception thereof, and means for synchronously operating said main conveyor means as well as said first and second auxiliary conveyor means.

12. An apparatus for the simultaneous transportation and distribution of printed matters into counted stacks and for the addition thereto of supplements, comprising first auxiliary conveyor means advancing in an approximately horizontal direction for bringing the printed matters, arriving from the printnig device separate and one behind the other, to a transfer place in the position required for transfer, said first auxiliary conveyor means including endless chain means provided with abutment surface means for the printed matter formed by strut means, pipe means arranged at said strut means for the conduction therethrough of suction air and pressurized air, said pipe means being provided with discharge apertures terminating essentially within the plane of abutment of said abutment surface means, vacuum pressure chamber means in said first auxiliary conveyor means, said pipe means coming into communication sequentially with said chamber means, main conveyor means including second endless chain means positively guided in orthogonal planes and gripper means on said chain means for automatically and individually picking up the printed matters at said transfer place to convey the same in a suspended manner, parallel to each other and at a short distance one behind the other, essentially transversely to a direction of movement to the distribution station, said second chain means being of double-side-bar construction and consisting of a plurality of chain elements, two pairs of projections disposed one behind the other being provided along the top side of individual chain elements, said gripper means being supported in said projections, means at said distribution station for actuating said gripper means to release said printed matters held thereby including means for counting said printed matters, said last-mentioned means including a plurality of stacking places each having control means to render selectively effective and ineffectual the supply of a preselected number of printed matters, said counting means including first means forming a light barrier and producing pulses and second means forming a pulse counter adapted to count the pulses produced by said first means, further means operatively connected with said second means for effectively actuating a respective control means after the corresponding stacking place has been supplied with its preselected number of printed matters and effecting the supply of printed matters to the next stacking place in the direction of advance movement of said main conveyor means until the last stacking place is supplied with its preselected number of printed matters whereupon the control means of the first stacking place is rendered operative to resupply its stacking place, and second auxiliary conveyor means having essentially vertical advance movement and including third endless chain means provided with abutment surface means for the supplements for supplying the supplements from another place to the empty gripper means of said main conveyor means at a transfer position following said distribution station in the direction of travel of said main conveyor means, means at said transfer position for actuating said gripper means to pick up said supplements and convey the supplements by said main conveyor means to said first auxiliary conveyor means, said pipe means forming a means for preparing said printed matters to receive its supplements released thereat by said gripper means, and means within the region of said preparing means for releasing said supplements to be added to the printed matters prepared thereat for the reception thereof, and means for synchronously operating said main conveyor means as well as said first and second auxiliary conveyor means.

13. An apparatus for the simultaneous transportation and distribution of printed matters into counted stacks and for the addition thereto of supplements, comprising first auxiliary conveyor means advancing in an approximately horizontal direction for bringing the printed matters, arriving from the printing device separate and one behind the other, to a transfer place in the position required for transfer, said first auxiliary conveyor means including endless chain means provided with abutment surface means for the printed matter formed by strut means, pipe means arranged at said strut means for the conduction therethrough of suction air and pressurized air, said pipe means being provided with discharge apertures terminating essentially within the plane of abutment of said abutment surface means, vacuum pressure chamber means in said first auxiliary conveyor means, said pipe means coming into communication sequentially with said chamber means, main conveyor means including second endless chain means positively guided in orthogonal planes and gripper means on said chain means for automatically and individually picking up the printed matters at said transfer place to convey the same in a suspended manner, parallel to each other and at a short distance one behind the other, essentially transversely to the direction of movement to a distribution station, said second chain means being of double-side-bar construction and consisting of a plurality of chain elements, two pairs of projections disposed one behind the other being provided along the top side of individual chain elements, said gripper means being supported in said projections, means at said distribution station for actuating said gripper means to release the printed matters held thereby including means for counting said printed matters, said releasing means including a plurality of stacking places each having control means to render selectively effective and ineffectual the supply of a preselected number of printed matters, said counting means including first means forming a light barrier and producing pulses and second means forming a pulse counter adapted to count the pulses produced by said first means, further means operatively connected with said second means for effectively actuating a respective control means after the corresponding stacking place has been supplied with its preselected number of printed matters and effecting the supply of printed matters to the next stacking place in the direction of advance movement of said main conveyor means until the last stacking place is supplied with its preselected number of printed matters whereupon the control means of the first stacking place is rendered operative to resupply its stacking place, and second auxiliary conveyor means having essentially vertical advance movement and including third endless chain means provided with abutment surface means for the supplements for supplying the supplements from another place to the empty gripper means of said main conveyor means at a transfer position following said distribution station in the direction of travel of said main conveyor means, means at said transfer position for actuating said gripper means to pick up said supplements and convey the supplements by said main conveyor means to said first auxiliary conveyor means, said pipe means forming a means for preparing said printed matters to receive the supplements released thereat by said gripper means, and means within the region of said preparing means for releasing said supplements to be added to the printed matters prepared thereat for the reception thereof, and means for synchronously operating said main conveyor means as well as said first and second auxiliary conveyor means, the forwardly moving portion of said main conveyor means including means for guiding essentially horizontally and including reversing roller means, said first auxiliary conveyor means being arranged near the beginning of said forwardly moving portion, said second auxiliary conveyor means being arranged within the area of said reversing means leading to the returning portion of said main conveyor means, and said distribution station and release, counting and control means being arranged between said first and second auxiliary conveyor means.

14. An apparatus for the simultaneous transportation and distribution of printed matters into counted stacks and for the addition thereto of supplements, comprising first auxiliary conveyor means advancing in an approximately horizontal direction for bringing the printed matters, arriving from the printing device separate and one behind the other, to a transfer place in the position required for transfer, said first auxiliary conveyor means including endless chain means provided with abutment surface means for the printed matter, main conveyor means including second endless chain means positively guided in orthogonal planes and gripper means on said chain means for automatically and individually picking up the printed matters at said transfer place to convey the same in a suspended manner, parallel to each other and at a short distance one behind the other, essentially transversely to the direction of movement to a distribution station, said second chain means being of double-side-bar construction and consisting of a plurality of chain elements, two pairs of projections disposed one behind the other being provided along the top side of individual chain elements, said gripper means being of clothespin-like construction each having two mutually pivotable members and means including pin means suppporting said pivotable members in said chain means, said pivotable members being non-rotatably mounted on said pin means, control lever means, mounted on said pin means for rotation therewith, and spring means having a bow-shaped portion and clamped between said lever means, means for actuating said gripper means to release said printed matters held thereby including means for counting said printed matters at said distribution station, and second auxiliary conveyor means having an essentially vertical advance movement and including third endless chain means provided with abutment surface means for the supplements for supplying the supplements from another place to the empty gripper means of said main conveyor means at a transfer position following said distribution station in the direction of travel of said main conveyor means, means at said transfer position for actuating said gripper means to pick up said supplements and convey the supplements by said main conveyor means to said first auxiliary conveyor means, said first auxiliary conveyor means including means for preparing said printed matters to receive the supplements released thereat by said gripper means, and means within the region of said preparing means for releasing said supplements to be added to the printed matters prepared thereat for the reception thereof, and means for synchronously operating said main conveyor means as well as said first and second auxiliary conveyor means.

15. An apparatus for the simultaneous transportation and distribution of printed matters into counted stacks and for the addition thereto of supplements, comprising first auxiliary conveyor means advancing in an approximately horizontal direction for bringing the printed matters, arriving from the printing device separate and one behind the other, to a transfer place in the position required for transfer, said first auxiliary conveyor means including endless chain means provided with abutment surface means for the printed matter, main conveyor means including second endless chain means positively guided in orthogonal planes and gripper means on said chain means for automatically and individually picking up the printed matters at said transfer place to convey the same in a suspended manner, parallel to each other and at a short distance one behind the other, essentially transversely to the direction of movement to a distribution station, said second chain means being of double-side-bar construction and consisting of a plurality of chain elements, two pairs of projections disposed one behind the other being provided along the top side of individual chain elements, said gripper means being of clothespin-like construction each having two mutually pivotable members and means including pin means supporting said pivotable members in said chain means, said pivotable members being non-rotatably mounted on said pin means, control lever means, mounted on said pin means for rotation therewith, and spring means having a bow-shaped portion and clamped between said lever means, said projections being provided with lateral recesses, said pin means being rotatably supported within said recesses, and said spring means being placed over a pair of said projections and secured in a groove located on the side opposite said projections for tensioning said spring means and securing said pin means, means for actuating said gripper means to release said printed matters held thereby including means for counting said printed matters at said distribution station, and second auxiliary conveyor means having an essentially vertical advance movement and including third endless chain means provided with abutment surface means for the supplements for supplying the supplements from another place to the empty gripper means of said main conveyor means at a transfer position following said distribution station in the direction of travel of said main conveyor means, means at said transfer position for actuating said gripper means to pick up said supplements and convey the supplements by said main conveyor means to said first auxiliary conveyor means, said first auxiliary conveyor means including means for preparing said printed matters to receive the supplements released thereat by said gripper means, and means within the region of said preparing means for releasing said supplements to be added to the printed matters prepared thereat for the reception thereof, and means for synchronously operating said main conveyor means as well as said first and second auxiliary conveyor means.

16. An apparatus for the simultaneous transportation and distribution of objects into counted stacks, comprising first auxiliary conveyor means for bringing the objects, arriving separate and one behind the other, to a transfer place in the position required for transfer thereof, said first auxiliary conveyor means including endless chain means provided with abutment surface means for the objects, main conveyor means including second endless chain means positively guided in the vertical and horizontal planes and pick-up means on said second chain means for automatically and individually picking up the objects at said transfer place to convey the same in a suspended manner, at a short distance one behind the other, to a distribution station, the chain means of said main conveyor means being of double-side-bar construction and consisting of a plurality of chain elements, two pairs of projections disposed one behind the other and disposed along the top side of individual chain elements, said pick-up means being of clothespin-like construction each having two mutually pivotable members and means including pin means supporting said pivotable members in said second chain means, said pivotable members being non-rotatably mounted on said pin means, control lever means mounted on said pin means for rotation therewith, and spring means having a bow-shaped portion and clamped between said lever means, said projections being provided with lateral recesses, said pin means being rotatably supported within said recesses, and said spring means being placed over a pair of said projections and secured in a groove located on the side opposite said projections for tensioning said spring means and securing said pin means, and means actuating said gripper means to release said objects held thereby including means for counting said objects at said distribution station.

17. An apparatus for the simultaneous transportation and distribution of printed matters into counted stacks and for the addition thereto of supplements, comprising first auxiliary conveyor means advancing in an approximately horizontal direction for bringing the printed matters, arriving from the printing device separate and one behind the other, to a transfer place in the position required for transfer, said first auxiliary conveyor means including endless chain means provided with abutment surface means for the printed matter, main conveyor means including second endless chain means positively guided in the horizontal and vertical planes and gripper means on said second chain means for automatically and individually picking up the printed matters at said transfer place to convey the same in a suspended manner, parallel to each other and at a short distance one behind the other, essentially transversely to the direction of movement to a distribution station, said second chain means being of double-side-bar construction and consisting of a plurality of chain elements, two pairs of projections disposed one behind the other on the top side of individual chain elements, said gripper means being of clothespin-like construction each having two mutually pivotable members and means including pin means supporting said pivotable members in said chain means, said pivotable members being non-rotatably mounted on said pin means, control lever means mounted on said pin means, and spring means having a bow-shaped portion and clamped between said lever means, said projections being provided with lateral recesses, said pin means being rotatably supported within said recesses, and said spring means being placed over a pair of said projections and secured in a groove located on the side opposite said projections for tensioning said spring means and securing said pin means, means including control cam means at said distribution station for actuating said lever means to open said gripper means and release said printed matters held thereby, counting means at said distribution station and second auxiliary conveyor means including third endless chain means provided with abutment surface means for the supplements for supplying the supplements from another place to the empty gripper means of said main conveyor means at a transfer position following said distribution in the direction of travel of said main conveyor means, means arranged at said transfer position for actuating said gripper means to pick up said supplements and convey the supplements by said main conveyor means to said first auxiliary conveyor means, said first auxiliary conveyor means including means for preparing said printed matters to receive the supplements released thereat by said gripper means, and means including further control cam means cooperating with said lever means and disposed within the region of said preparing means for opening said gripper means and releasing said supplements to be added to the printed matters prepared thereat for the reception thereof, and means for synchronously operating said main conveyor means as well as said first and second auxiliary conveyor means.

18. An apparatus for the simultaneous transportation and distribution of printed matters into counted stacks and for the addition thereto of supplements, comprising first auxiliary conveyor means advancing in an approximately horizontal direction for bringing the printed matters, arriving from the printing device separate and one behind the other, to a transfer place in the position required for transfer, said first auxiliary conveyor means including endless chain means provided with abutment surface means for the printed matter, main conveyor means including second endless chain means positively guided in the horizontal and vertical planes and gripper means on said second chain means for automatically and individually picking up the printed matters at said transfer place to convey the same in a suspended manner, parallel to each other and at a short distance one behind the other, essentially transversely to the direction of movement to a distribution station, said gripper means including lever means adapted to selectively open and close the same, said gripper means being of clothespin-like construction and each having two mutually pivotable members and means including pin means supporting said pivotable members in said chain means, means including a plurality of cam means cooperating with said lever means for actuating said gripper means to release said printed matters held thereby, said last-mentioned means including means for counting said printed matters at a plurality of stacking places in said distribution station, and second auxiliary conveyor means including third endless chain means provided with abutment surface means for the supplements for supplying the supplements from another place to the empty gripper means of said main conveyor means at a transfer position following said distribution station in the direction of travel of said main conveyor means, means at said transfer position for actuating said gripper means to pick up said supplements and convey the supplements by said main conveyor means to said first auxiliary conveyor means, said first auxiliary conveyor means including means for preparing said printed matters to receive the supplements released thereat by said gripper means, and means including further cam means cooperating with said lever means and located within the region of said preparing means for opening said gripper means and releasing said supplements to be added to the printed matters prepared thereat for the reception thereof, and means operatively connected with said counting means for rendering said first-mentioned cam means sequentially operative after the stacking place preceding in the advancing direction of said main conveyor chain means has been supplied with the preselected number of copies including means for recommencing the control cycle with the first stacking after the last stacking place has been supplied.

19. An apparatus for the simultaneous transportation and distribution of printed matters into counted stacks and for the addition thereto of supplements, comprising first auxiliary conveyor means advancing in an approximately horizontal direction for bringing the printed matters, arriving from the printed device separate and one behind the other, to a transfer place in the position required for transfer, said first auxiliary conveyor means including endless chain means provided with abutment surface means for the printed matter, main conveyor means including second endless chain means positively guided in the vertical and horizontal planes and gripper means on said second chain means for automatically and individually picking up the printed matters at said transfer place to convey the same in a suspended manner, parallel to each other and at a short distance one behind the other, essentially transversely to the direction of movement to a distribution station, said second chain means being of double-side-bar construction and consisting of a plurality of chain elements, two pairs of projections disposed one behind the other on the top side of individual chain elements, said gripper means being of clothespin-like construction each having two mutually pivotable members and means including pin means supporting said pivotable members in said chain means, said pivotable members being non-rotatably mounted on said pin means, control lever means, mounted on said pin means for rotation therewith, and spring means having a bow-shaped portion and clamped between said lever means, said projections being provided with lateral recesses, said pin means being rotatably supported within said recesses, and said spring means being placed over a pair of said projections and secured in a groove located on the side opposite said projections for tensioning said spring means and securing said pin means, means including at least two cam means and at least two counting means, one each for each stacking place for releasing and counting said printed matters at at least two stacking places in said distribution station, said cam means cooperating with said lever means to selectively open said gripper means and release the printed matters held thereby at a respective stacking place, and second auxiliary conveyor means having an essentially vertical advance movement and including third endless chain means provided with abutment surface means for the supplements for supplying the supplements from another place to the empty gripper means of said main conveyor means at a transfer position following said distribution station in the direction of travel of said main conveyor means, means at said transfer position for actuating said gripper means to pick up said supplements and convey the supplements by said main conveyor means to said first auxiliary conveyor means, said first auxiliary conveyor means including means for preparing said printed matters to receive the supplements released thereat by said gripper means, means within the region of said preparing means for releasing said supplements to be added to the printed matters prepared thereat for the reception thereof, and means for synchronously operating said main conveyor means as well as said first and second auxiliary conveyor means, and control means operatively connected with said cam means and operative in dependence on a respective counting means to selectively and alternately render a corresponding cam means inoperative upon the supply of a predetermined number of copies to the corresponding stacking place, the last cam means being fixed, and means operatively connected with the counter means of the last stacking place for resetting all preceding cam means to the operative position thereof after said last stacking place is supplied with its preselected number of copies.

20. An apparatus for the simultaneous transportation and distribution of printed matters into counted stacks and for the addition thereto of supplements, comprising first auxiliary endless conveyor means circulating in an approximately horizontal direction for bringing the printed matters, arriving from the printing device separate and one behind the other, to a transfer place in the position required for transfer, main conveyor means including gripper means for automatically and individually picking up the printed matters at said transfer place to convey the same in a suspended manner parallel to each other and at a short distance one behind the other essentially transversely to the direction of movement to a distribution station, means at the distribution place for selectively opening said gripper means and releasing said printed matters held thereby at a respective one of a plurality of stacking places including counting means for counting the number released at each stacking place and control means operatively connected with said counting means for effectively limiting the number of printed matters to be released at a respective stacking place and for releasing thereupon the preselected number of printed matters at the next stacking place in the direction of the advance movement of said main conveyor means until the last stacking place is supplied with its preselected number of printed matters whereupon the cycle is recommenced by supplying the first stacking place with printed matters.

21. An apparatus for the simultaneous insertion of a secondary part into a primary part to form a single unit and the distribution of said units into counted groups, comprising first auxiliary conveyor means circulating in an approximately horizontal direction for bringing the individual primary parts one behind the other to a transfer place in the position required for transfer, main conveyor means including gripper means for automatically and individually picking up the primary parts at said transfer place to convey the same in a suspended manner a short distance one behind the other to a distribution station, means for releasing said primary part from said gripper means and for counting said primary parts, said releasing and counting means being arranged within the region of said distribution station, and second auxiliary conveyor means for supplying said secondary parts from a source thereof to the gripper means of said main conveyor means at a transfer position following said distribution station, means for actuating said gripper means to pick up said secondary parts and convey the same by said main conveyor means to said first auxiliary conveyor means, and means within the region of said first auxiliary conveyor means for releasing said secondary parts from said gripper means for addition to said primary part.

References Cited in the file of this patent

UNITED STATES PATENTS

| | | |
|---|---|---|
| 1,444,088 | Sheldon | Feb. 6, 1923 |
| 1,783,575 | MacDonald | Dec. 2, 1930 |
| 1,951,300 | Zimmer | Mar. 13, 1934 |
| 2,911,213 | Zuercher et al. | Nov. 3, 1959 |